United States Patent
Itoh et al.

(10) Patent No.: US 6,775,454 B2
(45) Date of Patent: Aug. 10, 2004

(54) SILICA-BASED OPTICAL WAVEGUIDE CIRCUIT AND FABRICATION METHOD THEREOF

(75) Inventors: Mikitaka Itoh, Mito (JP); Takashi Saida, Mito (JP); Yasuhiro Hida, Hitachinaka (JP); Yasuyuki Inoue, Mito (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 10/142,130

(22) Filed: May 9, 2002

(65) Prior Publication Data

US 2002/0168166 A1 Nov. 14, 2002

(30) Foreign Application Priority Data

May 14, 2001 (JP) ........................................ 2001-143572

(51) Int. Cl.[7] .............................................. G02B 6/26
(52) U.S. Cl. ...................... 385/129; 385/130; 385/131; 385/43; 385/50
(58) Field of Search .............................. 385/14, 28, 43, 385/50, 51, 129–132

(56) References Cited

U.S. PATENT DOCUMENTS

| 5,153,935 | A | * | 10/1992 | Mueller | ........................ 385/50 |
| 6,003,222 | A | | 12/1999 | Barbarossa | |
| 6,030,540 | A | | 2/2000 | Yamamoto et al. | |
| 6,571,039 | B1 | * | 5/2003 | Al-hemyari et al. | ........... 385/43 |
| 2002/0031296 | A1 | * | 3/2002 | Lee et al. | ........................ 385/28 |
| 2003/0156794 | A1 | * | 8/2003 | Oh et al. | ........................ 385/43 |

FOREIGN PATENT DOCUMENTS

| JP | 04-081806 | | 3/1992 |
| JP | 05-249331 | | 9/1993 |
| JP | 06-027334 | | 2/1994 |
| JP | 06-174982 | | 6/1994 |
| JP | 2000-31598 | | 1/2000 |
| JP | 2001056415 | A * | 2/2001 |

* cited by examiner

*Primary Examiner*—Hemang Sanghavi
(74) *Attorney, Agent, or Firm*—Workman Nydegger (57) ABSTRACT

A silica-based optical waveguide circuit serves to reduce the time required to production while allowing a spot size converting function to work sufficiently. In a silica-based optical waveguide circuit comprising an input/output waveguide core formed to be thicker than an waveguide core and a tapered portion for connecting the input/output waveguide core and the waveguide core, wherein the waveguide circuit further has a core layer at each side of the input/output waveguide core, a thickness T of the core layer at the side of the input/output waveguide core is smaller than the thickness H of the input/output waveguide core.

23 Claims, 7 Drawing Sheets

SILICA-BASED OPTICAL WAVEGUIDE CIRCUIT AND FABRICATION METHOD THEREOF

This application is based on Patent Application No. 2001-143572 filed May 14, 2001 in Japan, the content of which is incorporated hereinto by reference.

BACKGROUND OF THE INVENTION

1. Field of the Invention

The present invention relates to a silica-based optical waveguide circuit and a fabrication method thereof, and more specifically, to a silica-based optical waveguide that serves to reduce possible coupling losses when coupled to another optical waveguide or fiber as well as a fabrication method thereof.

2. Description of the Related Art

With the rapid development of optical communications, there have been growing demands for increases in scale and integration level of silica-based optical waveguides, a decrease in manufacture costs thereof, and improvement of mass productivity thereof. To increase the scale and integration level, the confinement of light in a core must be enhanced. This serves to reduce the distance between adjacent optical waveguides and the bending radius thereof, thereby allowing a large number of optical waveguides to be arranged in a limited area.

When the confinement of light in a silica-based optical waveguide is enhanced, a possible coupling loss increases when this waveguide is coupled to an optical fiber or another optical component. A number of methods have been known for reducing this coupling loss. For example, a method of increasing the size of that portion of the core which correspond to an input and output section of the waveguide so as to accommodate the spot size of the fiber is practical in that fabrication tolerance or fiber connection tolerance can be increased. By way of example, Japanese Patent Application Laid-open No. 2001-56415 describes a spot size converter using a vertical and horizontal tapered waveguide.

Figure 7:
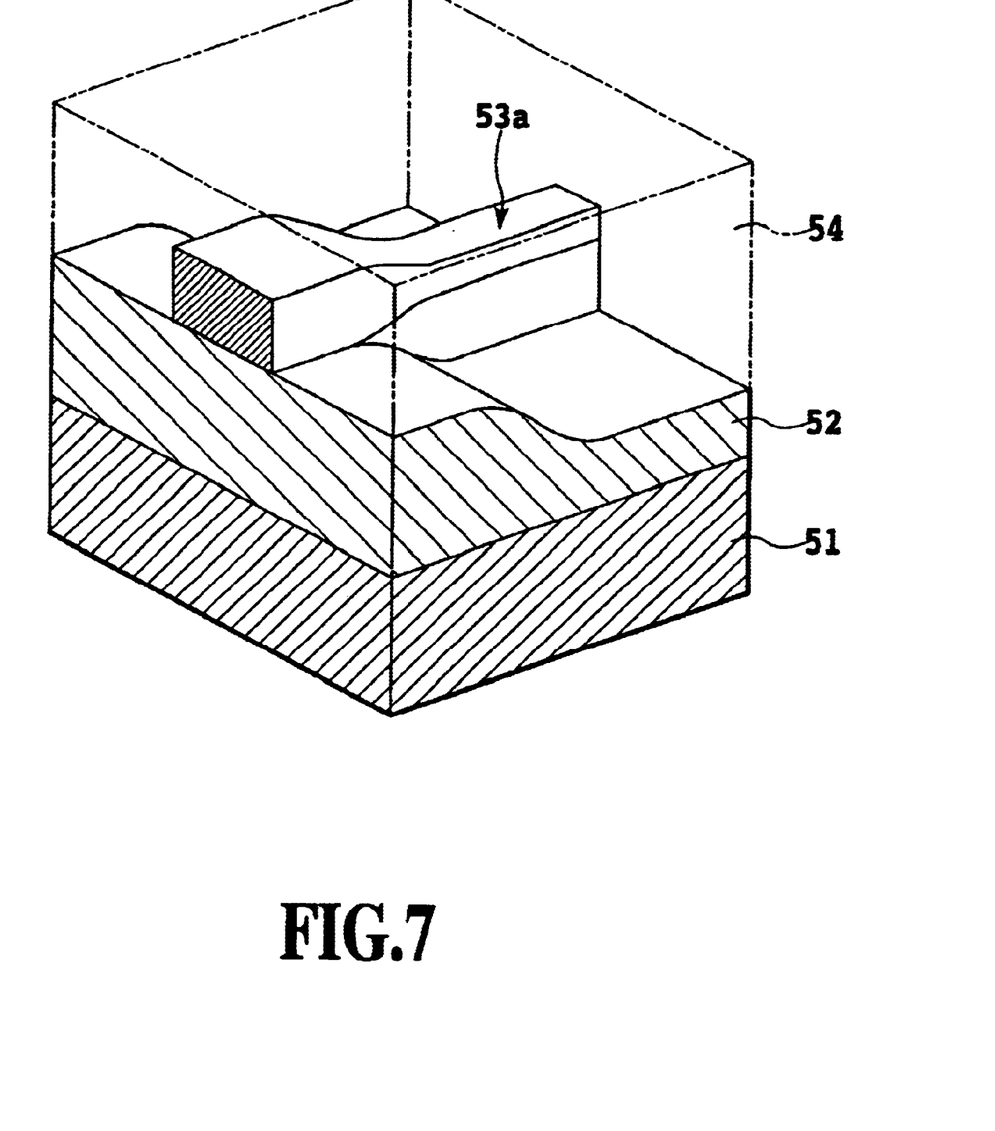
FIG. 7 is a schematic diagram showing a conventional spot size converter.

FIG. 7 shows a conventional spot size converter. The spot size converter has a lower cladding layer 52 formed on a substrate 51 and having a waveguide core 53a formed thereon. The waveguide core 53a is further covered with an upper cladding layer 54. Such a spot size converter has a simple structure and is effective in reducing the coupling loss. For example, for waveguide core specifications with which a coupling loss corresponding to about 2 dB may be caused by a difference in spot size between the waveguide core and the fiber, the coupling loss can be reduced to 0.2 dB or less by increasing the spot size using the vertical and horizontal taper.

However, an optical waveguide having such a spot size converter has a larger core thickness at the input and output section thereof than ordinary optical waveguides, thereby requiring a longer time to process the core by reactive ion etching. That is, such a process may reduce mass productivity compared to ordinary processes.

SUMMARY OF THE INVENTION

It is an object of the present invention to provide a silica-based optical waveguide that serves to reduce the time required for production while allowing a spot size converting function to work sufficiently as well as a fabrication method therefor.

To attain this object, the present invention provides a silica-based optical waveguide circuit comprising a substrate, a lower cladding layer placed on the substrate, a waveguide core for transmitting light formed on the lower cladding layer, an input/output waveguide core whose thickness H is thicker than the waveguide core, a tapered portion for connecting the input/output waveguide core and the waveguide core, and an upper cladding layer that covers the lower cladding layer and the cores, the waveguide circuit further comprises a core layer at each side of the input/output waveguide core, and a thickness T of the core layer at each side of the input/output waveguide core is smaller than the thickness H.

With this configuration, the core layer thinner than the input/output waveguide core is formed at each side of the input/output waveguide core, thereby reducing the time required to produce a silica-based optical waveguide circuit while allowing a spot size converting function to work sufficiently.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Embodiments of the present invention will be described below in detail with reference to the drawings. In the following embodiments, silica-based glass films constituting a core layer, a lower cladding layer, and an upper cladding layer are formed using a flame hydrolysis deposition method. However, the present invention is not limited to fabrication methods for glass films, but some or all of the glass films can be produced using a glass film forming method such as a sputtering or CVD (Chemical Vapor Deposition) process. Further, in the embodiment, prerequisites for the description include an optical communication wavelength of 1.55 $\mu$m and a single mode optical fiber.

Figure 1:
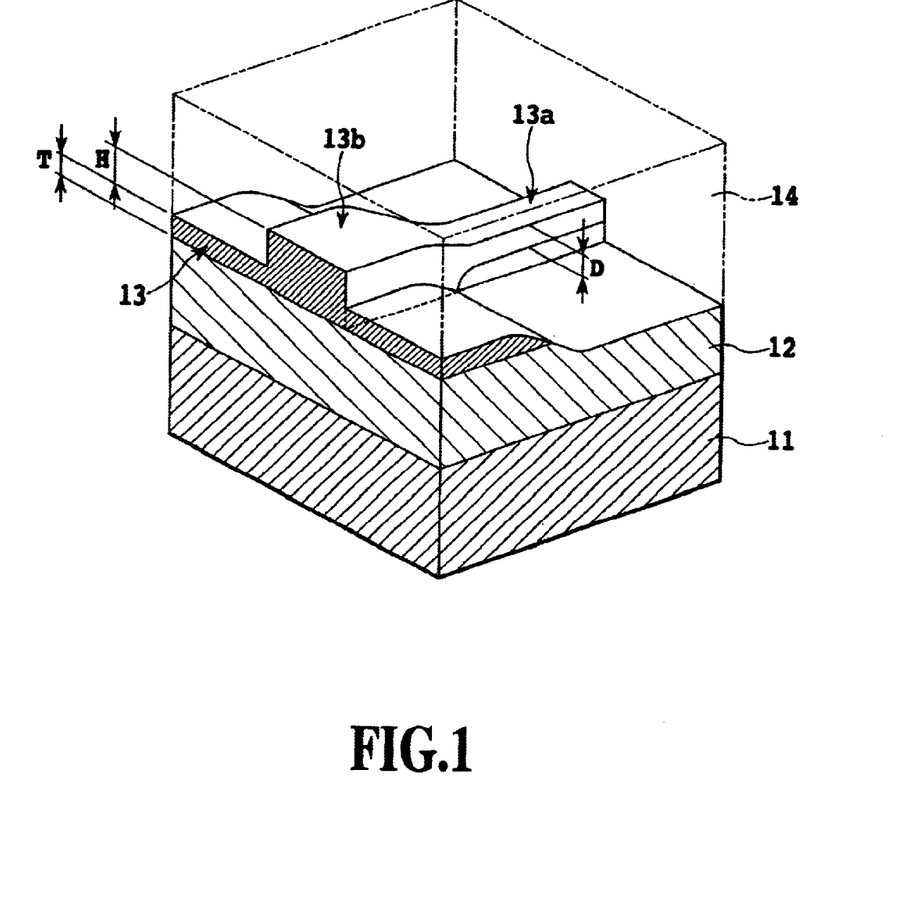
FIG. 1 is a schematic diagram showing a spot size converter according to an embodiment of the present invention.

FIG. 1 is a schematic diagram showing a spot size converter according to an embodiment of the present invention. In the spot size converter, a lower cladding layer 12 is formed on a substrate 11. An upper cladding layer 14 covers a waveguide core 13a and an input/output waveguide core 13b formed by a core layer 13 deposited on the lower cladding layer 12. A portion of the core layer 13 having a fixed layer thickness is left at each side of the input/output waveguide core 13b.

In this case, the input/output core 13b has a portion with a tapered top surface and tapered sides. The waveguide core 13a and the input/output core 13b are connected with the tapered portion. In FIG. 1, the input/output waveguide core 13b is shown having a rectangular cross section, but may have a trapezoidal cross section or have a cross section with its upper edge chamfered with a straight line or a circular arc. Further, the portion of the core layer 13 having the fixed layer thickness does not need to have the uniform thickness but may be trapezoidal. The tapered waveguide preferably has a length of 100 μm or more in a direction in which light is guided, in order to convert the spot size without an excess losses. Further, to stabilize an increased spot size, the input/output waveguide core 13b desirably has a fixed width and a fixed thickness over a distance of 100 μm or more from an input/output waveguide edge in a direction in which light is guided.

FIGS. 2A–2F show a fabrication method for a spot size converter according to a first embodiment of the present invention. First, a lower cladding layer 12 mainly composed of $SiO_2$ is deposited on a substrate 11 composed of silicon or silica-glass using the flame hydrolysis deposition method (see FIG. 2A). Then, a core layer 13 mainly composed of $GeO_2$-doped $SiO_2$ is deposited (see FIG. 2B), and then vitrified in an electric furnace so as to be transparent. The lower cladding layer 12 has a layer thickness of 20 μm and the core layer 13 has a layer thickness of 11 μm.

Figure 2A:
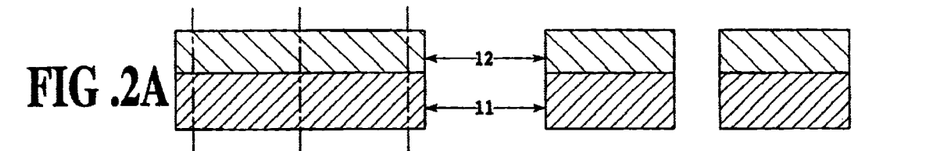
FIGS. 2A–2F are diagrams showing a fabrication method for a spot size converter according to a first embodiment of the present invention.
Figure 2B:
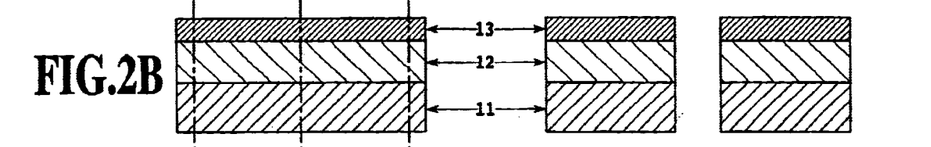
Figure 2C:
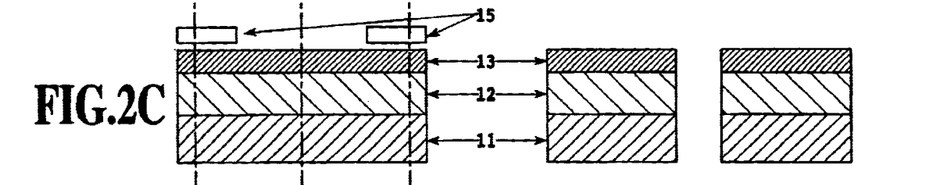
Figure 2D:
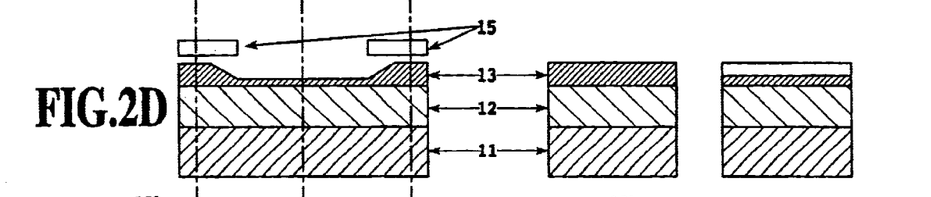

A shadow mask 15 is placed above the substrate 11, on which the lower cladding layer 12 and the core layer 13 have been formed (see FIG. 2C). The distance between the shadow mask 15 and the other layer is set at 1 mm. The shadow mask 15 covers the areas where the input/output waveguide core 13b is to be laid. Then, the core layer 13 is etched to a specified depth through the shadow mask 15 using a reactive ion etching process (see FIG. 2D). In the first embodiment, 6 μm of the core layer was removed so that the waveguide core 13a has a layer thickness of 5 μm. At this time, at the boundary of the shadow mask 15, plasma is directed under the shadow mask 15 to slightly etch that portion of the core layer 13 which is located under the shadow mask 15, thereby forming a tapered structure gently inclined in the vertical direction. In this manner, the input/output waveguide core and the waveguide core have different thicknesses, and the input/output waveguide core and the waveguide core are connected with a gentle vertical taper.

Figure 2E:
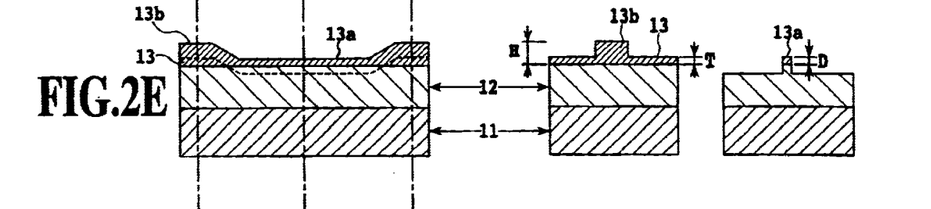

Then, the core, through which light is guided, is patterned using photolithography and reactive ion etching (see FIG. 2E). At this time, etching is ended so as to leave a layer with a certain thickness instead of removing the entire 11 μm layer. Accordingly, the cross section of the input/output core, that is, a cross section X, shown in FIG. 2E, is a convex shape. In the first embodiment, the thickness T were 2.5 and 5 μm, and etching time could be reduced by 23 or 45%, respectively.

Figure 2F:
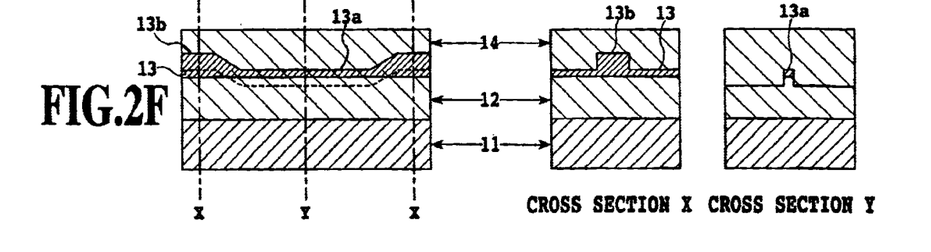

Finally, an upper cladding layer 14 is deposited and vitrified so as to be transparent, thereby obtaining the spot size converter shown in FIG. 1 (see FIG. 2F). The specifications of the optical waveguide used in the first embodiment are as follows: a refractive index difference between the core and cladding layers is 1.5%, the waveguide core 13a has a width of 5 μm and a thickness D of 5 μm, and the input/output waveguide core 13b has a width of 11 μm and a thickness H of 11 μm.

Figure 3:
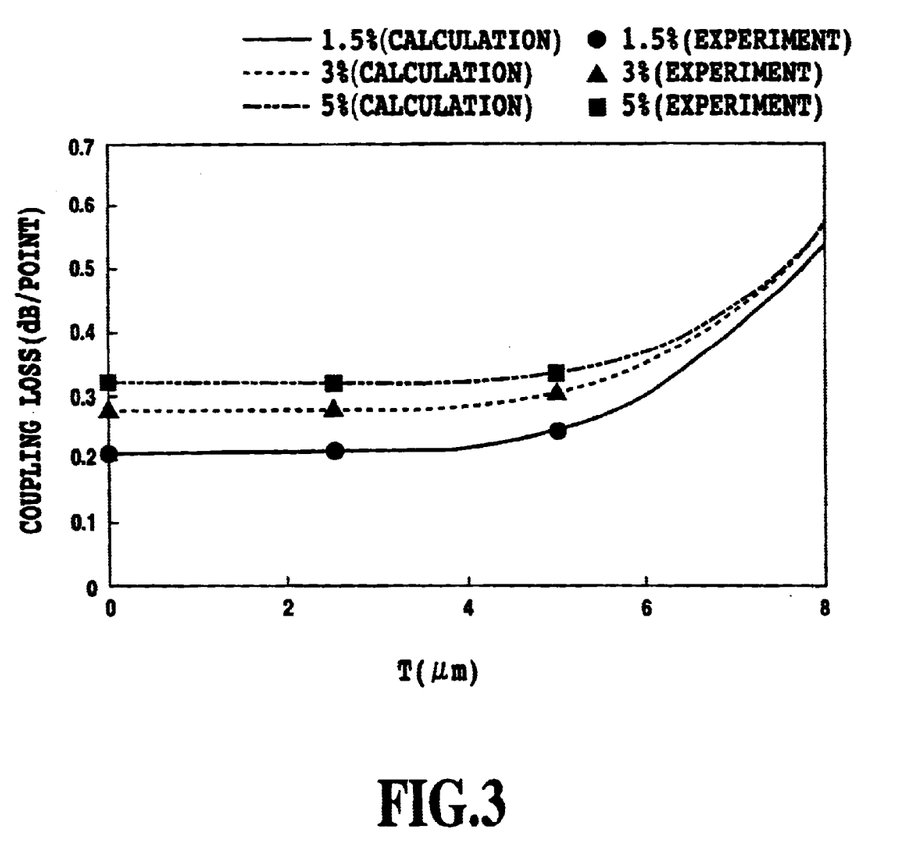
FIG. 3 is a diagram showing a coupling loss in the spot size converter according to the embodiment of the present invention shown in FIG. 1.

FIG. 3 shows a coupling loss in the spot size converter according to the embodiment of the present invention shown in FIG. 1. This figure shows a coupling loss resulting from the coupling between the silica-based optical waveguide circuit produced in the manner shown in FIG. 2 and a single-mode optical fiber. When the thickness T is equal to 0 μm, the coupling loss is 0.21 dB/point. When the thickness T increases to 2.5 μm, the coupling loss is 0.22 dB/point, and when the thickness T increases to 5 μm, the coupling loss is 0.25 dB/point. That is, even if the core layer with a thickness of 5 μm is left at each side of the input/output waveguide core, the coupling loss increases by only 0.04 dB.

These results agree well with the results of numerical calculations executed using a finite differential method. FIG. 3 also shows a case of a waveguide in which a refractive index difference is 3 or 5%, the input/output waveguide core has a width of 11 μm and a thickness H of 11 μm. As in the case in which a refractive index difference is 1.5%, this figure shows that the coupling loss starts to increase when the layer thickness T exceeds 5 μm. That is, regardless of a refractive index difference, the coupling loss is prevented from increasing excessively as long as the thickness T is equal to or smaller than half of the thickness H of the input/output waveguide core.

In this embodiment, the input/output waveguide core dose not need to have a rectangular cross section, as described above. Also, the thickness T at each side of the input/output waveguide core has preferably to be smaller than the thickness H of the input/output waveguide core. Further, to prevent light propagating through the input/output waveguide core from infiltrating into a portion other than the input/output waveguide core so as not to increase the coupling loss, the thickness T has preferably to be equal to or smaller than half of the thickness H of the input/output waveguide core.

FIGS. 4A–4F show a fabrication method for a spot size converter according to a second embodiment of the present invention. First, a lower cladding layer 12 mainly composed of $SiO_2$ is deposited on a substrate 11 composed of silicon or silica-glass using the flame hydrolysis deposition method (see FIG. 4A). Then, a core layer 13 mainly composed of $GeO_2$-doped $SiO_2$ is deposited (see FIG. 4B), and then vitrified in an electric furnace so as to be transparent. The core layer 13 has the same thickness D as the waveguide core.

Figure 4A:
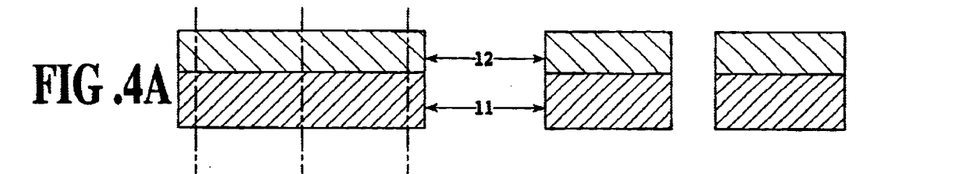
FIGS. 4A–4F are diagrams showing a fabrication method for a spot size converter according to a second embodiment of the present invention.
Figure 4B:
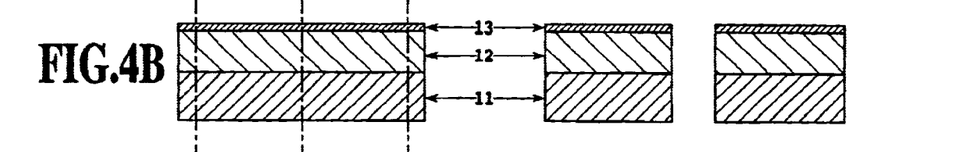
Figure 4C:
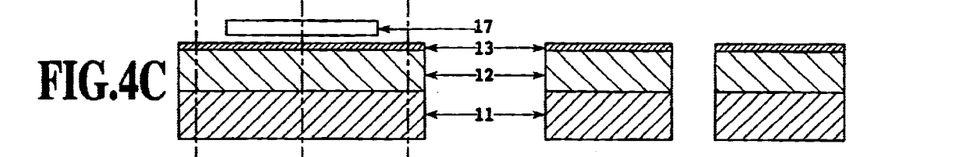

A shadow mask 17 is placed above the substrate 11, on which the lower cladding layer 12 (see FIG. 4C). The distance between the shadow mask 17 and the core layer 13 is set at 1 mm. The shadow mask 17 covers the areas where the waveguide core 13a is to be laid. Then, the core layer 13 with a thickness of H-D is additionally deposited, and a gentle taper is created under the edge of the shadow mask 17 (see FIG. 4D). The remaining part of the fabrication process is that same as that in the method shown in FIG. 2 (see FIGS. 4E and 4F).

Figure 4D:
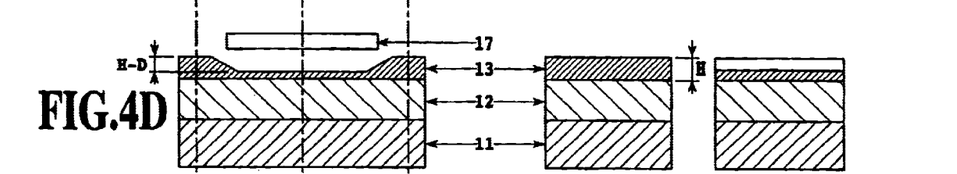
Figure 4E:
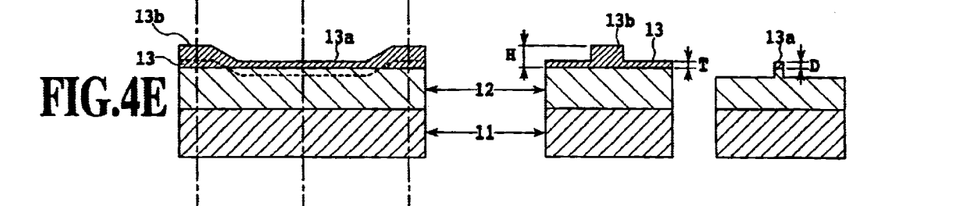
Figure 4F:
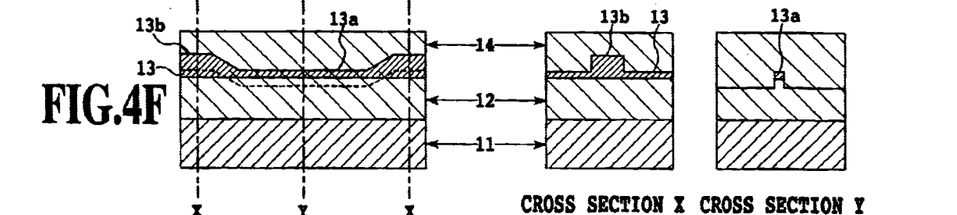

In the fabrication process shown in FIG.4D, it is difficult to form the core layer 13 through the shadow mask 17 using the flame hydrolysis deposition method. Then the vapor phase deposition procedures such as a sputtering method and a plasma CVD technique are suitable for the additional formation of the core layer 13.

Figure 5A:
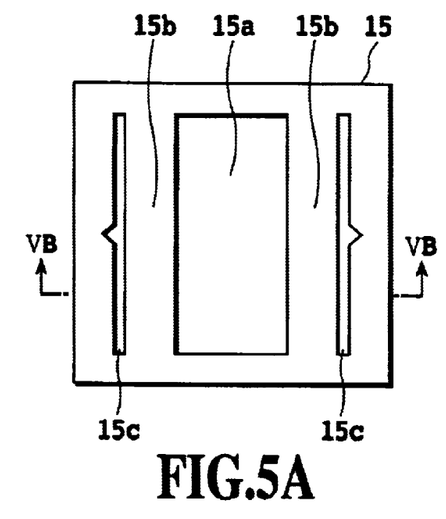
FIGS. 5A–5E are diagrams showing a shadow mask for use in the fabrication method according to the first embodiment of the present invention.
Figure 5B:
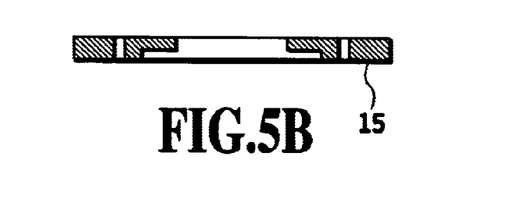
Figure 5C:
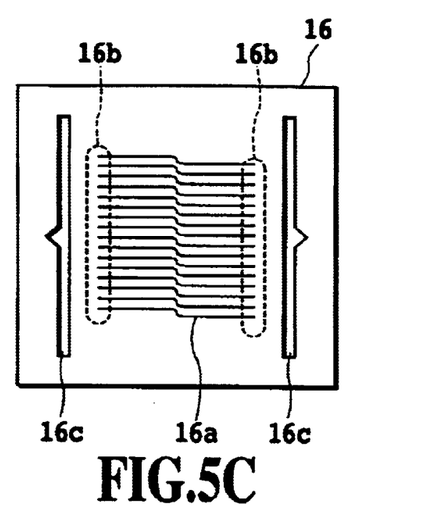

The above described shadow mask will be described in further detail. In the fabrication method according to the first embodiment, the vertical taper produced using the shadow mask 15 must be precisely aligned with the pattern of the waveguide core produced by photolithography and reactive ion etching. FIG. 5A and FIG. 5B show a shadow mask used in the fabrication method according to the first embodiment of the present invention. FIG. 5C shows a photomask which is used to form a waveguide core pattern. The shadow mask 15 is used to form a vertical taper in input and output sections 16b of a circuit pattern 16a. The shadow mask 15 has an opening 15a where the circuit pattern 16a is to be laid, a mask 15b corresponding to the input and output sections 16b, and marker forming sections 15c for alignment. The thickness of the marker forming sections 15c is larger than the other part of the mask, as shown in FIG. 5B.

Figure 5D:
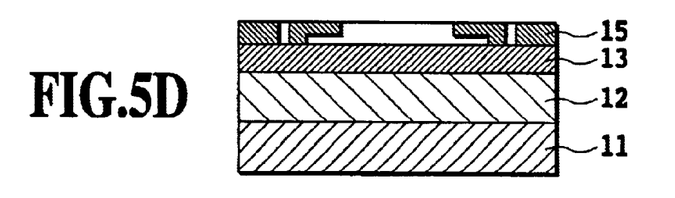
Figure 5E:
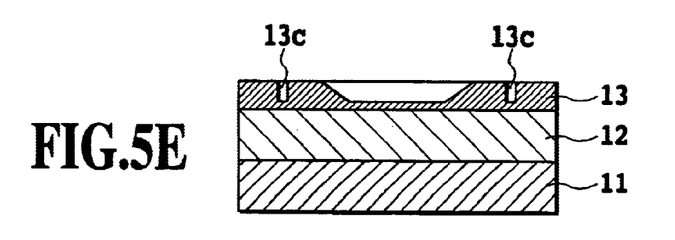

This shadow mask 15 is arranged so that the marker forming sections 15c are in contact with the core layer 13, as shown in FIG. 5D. In this state, shadow etching is carried out to form a gently tapered structure in each of the input and output sections, while sharply forming a concave structure in each marker forming section 15c (see FIG. 5E). The concave structure formed by the marker forming section 15c can be aligned with a marker section 16c of the photomask 16.

Figure 6A:
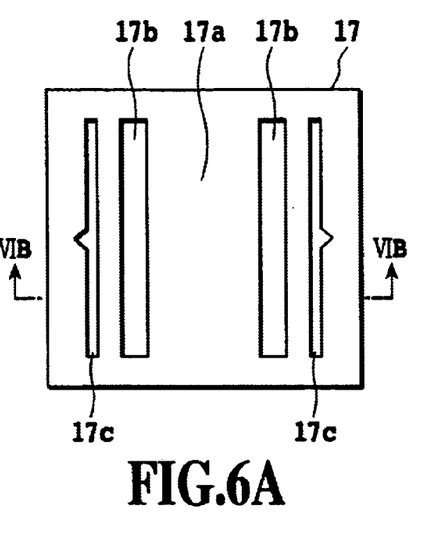
FIGS. 6A–6E are diagrams showing a shadow mask for use in the fabrication method according to the second embodiment of the present invention.
Figure 6B:
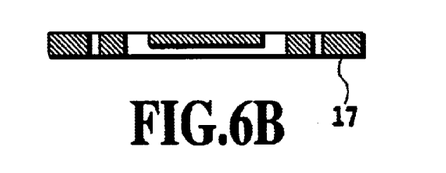
Figure 6C:
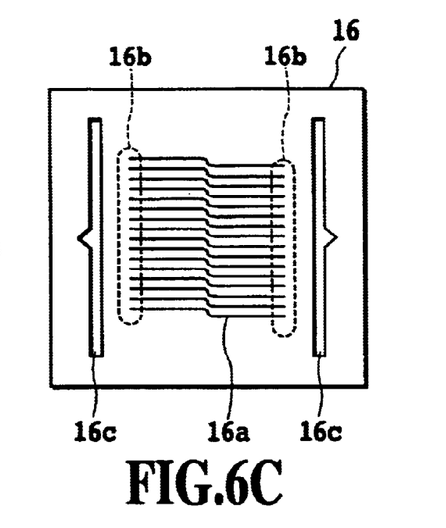

FIG. 6A and FIG. 6B show a shadow mask used in the fabrication method according to the second embodiment of the present invention. FIG. 6C shows a photomask which is used to form a waveguide core pattern. The shadow mask 17 is used to form a vertical taper in input and output sections 16b of a circuit pattern 16a. The shadow mask 17 has a mask 17a where the circuit pattern 16a is to be laid, an opening 17b corresponding to the input and output sections 16b, and marker forming sections 17c for alignment. The thickness of the marker forming sections 17c is larger than the other part of the mask, as shown in FIG. 6B.

Figure 6D:
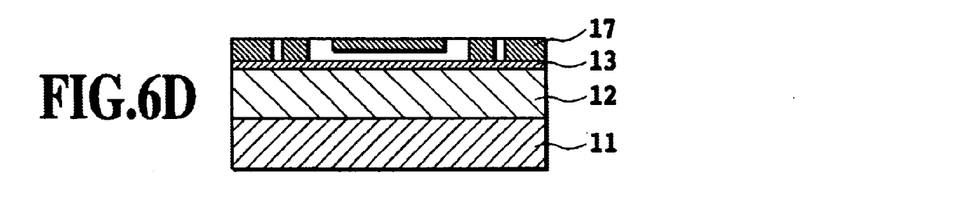
Figure 6E:
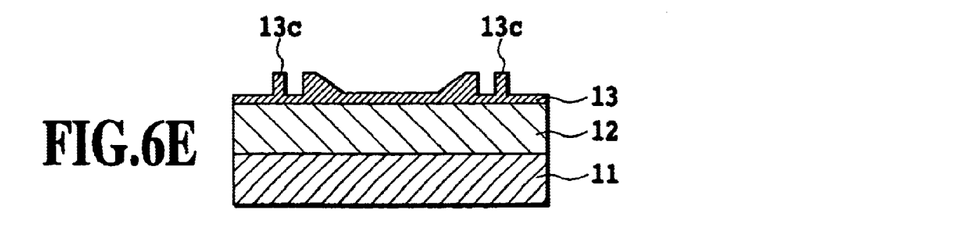

This shadow mask 17 is arranged so that the marker forming sections 17c are in contact with the core layer 13, as shown in FIG. 6D. In this state, shadow depositing is carried out to form a gently tapered structure in each of the input and output sections, while sharply forming a convex structure in each marker forming section 17c (see FIG. 6E). The convex structure formed by the marker forming section 17c can be aligned with a marker section 16c of the photomask 16.

The alignment markers of the photomask have the same shape as the alignment markers of the shadow mask, but may have a shape different from that of the shadow mask. Further, in this embodiment, the distance between the central portion of the shadow mask 15 and 17 and the core layer 13 is 1 mm, but may be set at an arbitrary value equal to or larger than 100 µm depending on specifications for the core, the circuit pattern, fabrication conditions, or the like. Furthermore, in this embodiment, the shadow mask 15 and 17 is arranged so that the marker forming sections 15C and 17c are in contact with the core layer 13. However, the marker forming sections 15c and 17c may be spaced from the core layer 13 as long as the resulting concave and convex suffice for the alignment.

It should be appreciated that by varying the specifications of the optical waveguide, the above described first and second embodiments can be applied to the case in which an optical communication wavelength of 1.3 µm is used or the waveguide is connected to a dispersion shift fiber.

In this embodiment, the thickness H of the input/output waveguide core and the thickness D of the waveguide core may be arbitrarily set taking process loads and the specifications of the optical waveguide used into consideration provided that the thickness T of the core layer at each side of the input/output waveguide core is within the following range:

$0 < T < H-D$ (when $D > H/2$)

$0 < T \leq H/2$ (when $D \leq H/2$)

Further, the present invention produces the same effects when a core layer is directly formed on a silica-glass wafer. The present invention is applicable to all silica-based optical waveguide circuits requiring a spot size converter.

Furthermore, the spot size converter according to the present invention is applicable regardless of a glass composition for a silica-based optical waveguide circuit or the fabrication method therefor provided that the input/output waveguide core is formed to be thicker than the waveguide core, and that the input/output waveguide core and the waveguide core are connected together with a gentle tapered structure.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A silica-based optical waveguide circuit comprising a substrate, a lower cladding layer placed on said substrate, a waveguide core for transmitting light formed on said lower cladding layer, an input/output waveguide core whose thickness H is thicker than said waveguide core, a tapered portion for connecting said input/output waveguide core and said waveguide core, and an upper cladding layer that covers said lower cladding layer and said cores;

wherein said waveguide circuit further comprises a core layer at each side of said input/output waveguide core, and a thickness T of said core layer at each side of said input/output waveguide core is smaller than the thickness H.

2. A silica-based optical waveguide circuit as claimed in claim 1, wherein the thickness T of said core layer at each side of said input/output waveguide core is within the following range:

$T \leq H/2$.

3. A silica-based optical waveguide circuit as claimed in claim 2, wherein the thickness H of said input/output waveguide core and a thickness D of said waveguide core have the following relationship with the thickness T of said core layer at each side of said input/output waveguide core:

$0 < T < H-D$ (when $D > H/2$)

$0 < T \leq H/2$ (when $D \leq H/2$).

4. A silica-based optical waveguide circuit as claimed in claim 1, wherein the length of said tapered portion is 100 µm or more in a direction in which light is guided.

5. A silica-based optical waveguide circuit as claimed in claim 1, wherein the thickness of said input/output waveguide core is fixed over 100 µm or more from an edge of an input/output section of the circuit in the direction in which light is guided.

6. A silica-based optical waveguide circuit as claimed in claim 1, wherein said input/output waveguide core and said core layer constitute a convex cross section of said input/output section.

7. A silica-based optical waveguide circuit as claimed in claim 1, wherein a material for said substrate is silicon or silica-glass.

8. A silica-based optical waveguide circuit comprising a lower cladding layer composed of a silica-glass substrate, a waveguide core for transmitting light formed on said lower cladding layer, an input/output waveguide core whose thickness H is thicker than said waveguide core, a tapered portion for connecting said input/output waveguide core and said waveguide core, and an upper cladding layer that covers said lower cladding layer and said cores;

wherein said waveguide circuit further comprises a core layer at each side of said input/output waveguide core, and a thickness T of said core layer at each side of said input/output waveguide core is smaller than the thickness H.

9. A silica-based optical waveguide circuit as claimed in claim 8, wherein the thickness T of said core layer at each side of said input/output waveguide core is within the following range:

$T \leq H/2.$

10. A silica-based optical waveguide circuit as claimed in claim 9, wherein the thickness H of said input/output waveguide core and a thickness D of said waveguide core have the following relationship with the thickness T of said core layer at each side of said input/output waveguide core:

$0 < T < H-D$ (when $D > H/2$)

$0 < T \leq H/2$ (when $D \leq H/2$).

11. A silica-based optical waveguide circuit as claimed in claim 8, wherein the length of said tapered portion is 100 μm or more in a direction in which light is guided.

12. A silica-based optical waveguide circuit as claimed in claim 8, wherein the thickness of said input/output waveguide core is fixed over 100 μm or more from an edge of an input/output section of the circuit in the direction in which light is guided.

13. A silica-based optical waveguide circuit as claimed in claim 8, wherein said input/output waveguide core and said core layer constitute a convex cross section of said input/output section.

14. A fabrication method for a silica-based optical waveguide circuit comprising a substrate, a lower cladding layer placed on the substrate, a waveguide core for transmitting light formed on said lower cladding layer, an input/output waveguide core whose thickness H is thicker than said waveguide core, a tapered portion for connecting said input/output waveguide core and said waveguide core, and an upper cladding layer that covers said lower cladding layer and said cores, the method comprising the steps of:

depositing a core layer with the same thickness as said input/output waveguide core on said lower cladding layer;

etching a part of said core layer to make a thinner waveguide core than said input/output waveguide core and said tapered portion; and processing said core layer to form said waveguide core and said input/output waveguide core, wherein said core layer with a thickness T at each side of said input/output waveguide core thinner than the thickness H is formed at each side of said input/output waveguide core.

15. A fabrication method for a silica-based optical waveguide circuit as claimed in claim 14, wherein at the step of etching a part of said core layer, a mask placed above said core layer is used to make a thinner waveguide core than said input/output waveguide core and said tapered portion.

16. A fabrication method for a silica-based optical waveguide circuit as claimed in claim 15, wherein said mask is located at a distance of 100 μm or more from said core layer.

17. A fabrication method for a silica-based optical waveguide circuit as claimed in claim 15, wherein said mask has marker forming sections for alignment in the step of forming said waveguide core and said input/output waveguide core.

18. A fabrication method for a silica-based optical waveguide circuit as claimed in claim 15, wherein said marker forming sections are formed to be in contact with said core layer.

19. A fabrication method for a silica-based optical waveguide circuit comprising a substrate, a lower cladding layer placed on the substrate, a waveguide core for transmitting light formed on said lower cladding layer, an input/output waveguide core whose thickness H is thicker than said waveguide core, a tapered portion for connecting said input/output waveguide core and said waveguide core, and an upper cladding layer that covers said lower cladding layer and said cores, the method comprising the steps of:

depositing a core layer with the same thickness as said waveguide core on said lower cladding layer;

further depositing said core layer to make a thicker input/output waveguide core than said waveguide core and said tapered portion; and processing said core layer to form said waveguide core and said input/output waveguide core, wherein said core layer with a thickness T at each side of said input/output waveguide core thinner than the thickness H is formed at each side of said input/output waveguide core.

20. A fabrication method for a silica-based optical waveguide circuit as claimed in claim 19, wherein at the step of further depositing said core layer, a mask placed above said core layer is used to make a thicker input/output waveguide core than said waveguide core and said tapered portion.

21. A fabrication method for a silica-based optical waveguide circuit as claimed in claim 20, wherein said mask is located at a distance of 100 μm or more from said core layer.

22. A fabrication method for a silica-based optical waveguide circuit as claimed in claim 20, wherein said mask has marker forming sections for alignment in the step of forming said waveguide core and said input/output waveguide core.

23. A fabrication method for a silica-based optical waveguide circuit as claimed in claim 22, wherein said marker forming sections are formed to be in contact with said core layer.

* * * * *